United States Patent
Aoki

(10) Patent No.: US 6,533,009 B2
(45) Date of Patent: Mar. 18, 2003

(54) NOISE DAMPER FOR PNEUMATIC TIRE

(75) Inventor: Chieko Aoki, Kobe (JP)

(73) Assignee: Sumitomo Rubber Industries, Ltd.

( * ) Notice: Subject to any disclaimer, the term of this patent is extended or adjusted under 35 U.S.C. 154(b) by 0 days.

(21) Appl. No.: 09/873,237

(22) Filed: Jun. 5, 2001

(65) Prior Publication Data

US 2002/0033215 A1 Mar. 21, 2002

(30) Foreign Application Priority Data

Jun. 5, 2000 (JP) ........................................ 2000-168039
Jun. 5, 2000 (JP) ........................................ 2000-168042

(51) Int. Cl.⁷ ........................ B60B 21/02; B60B 19/00; B60C 19/00; B60C 5/22
(52) U.S. Cl. ................ 152/381.6; 152/339.1; 301/6.91
(58) Field of Search ............... 74/443; 295/7; 301/6.91, 5.21, 5.22; 152/381.6, 381.5, 153, 209.2, 450, 209.4, 209.6, 209.7, 339.1, 311, 399, 391

(56) References Cited

U.S. PATENT DOCUMENTS

| | | | | |
|---|---|---|---|---|
| 516,669 A | * | 3/1894 | Washburn ................. | 152/339.1 |
| 3,047,285 A | * | 7/1962 | Gross ........................ | 152/153 |
| 3,930,526 A | * | 1/1976 | Edwards ................... | 152/154.1 |
| 4,480,669 A | * | 11/1984 | Skidmore .................. | 152/153 |
| 4,755,006 A | * | 7/1988 | Clay et al. ................. | 304/5.22 |
| 5,390,718 A | * | 2/1995 | Victor ........................ | 152/375 |
| 6,343,843 B1 | * | 2/2002 | Nishikawa ................. | 139/391 |
| 6,450,225 B2 | * | 9/2002 | Yukawa et al. ........... | 152/381.6 |
| 2001/0007268 A1 | * | 7/2001 | Yukawa et al. ........... | 152/381.6 |

FOREIGN PATENT DOCUMENTS

| | | |
|---|---|---|
| JP | U63112905 | 7/1988 |
| JP | B2714682 | 2/1995 |
| JP | A8132816 | 5/1996 |

* cited by examiner

Primary Examiner—S. Joseph Morano
Assistant Examiner—Jason R. Bellinger
(74) Attorney, Agent, or Firm—Birch, Stewart, Kolasch & Birch, LLP

(57) ABSTRACT

A tire noise damper to be disposed in an annular tire cavity formed between a wheel rim and a pneumatic tire mounted thereon. The damper comprises an annular band-like body which is made of an elastomeric material and provided with at least one generally U-shaped cut oriented in a circumferential direction. The cutout formed by the at least one U-shaped cut forms a flap risen by a centrifugal force during running, and the remainder forms a base band to be put around a bottom of the wheel rim in an elongated condition. In order to reduce resonance of the air in the tire cavity in not only the fundamental mode but also the higher harmonic modes, the flap may have a relatively long length such that, when risen, a radially outer end portion thereof comes into contact with the radially inside of a tread portion of the tire. Further, the flap may be made of nonwoven fabric at least partially.

12 Claims, 11 Drawing Sheets polystyrene vinyl polyisoprene

NOISE DAMPER FOR PNEUMATIC TIRE

BACKGROUND OF THE INVENTION

1. Field of the Invention

The present invention relates to a noise damper for a pneumatic tire, more particularly to a band-shaped damper with a flap rising by a centrifugal force during running.

In recent years, as the mechanical noise from automobiles especially passenger cars has been greatly reduced, the tires especially passenger car tires are strongly required to reduce their noise. There are many factors in tire noise, but a circumferential resonance of the air in the annular tire cavity is a major factor. That is, a ring of air inside the tire which is continuous around the rim is excited by vibrations during running and resonates in the circumferential direction. Usually, a resonance peak occurs in a frequency range of from 50 to 400 Hz according to the tire size.

2. Description of the Related Art Including Information Disclosed Under 37 CFR 1.97-1.99

In published Japanese patent JP-B-7-14682 (application No. 61-284973), an assembly of a wheel rim and a pneumatic tire mounted thereon is disclosed, wherein a ball-like body which is made of rubber, sponge or the like is put in the annular tire cavity to block the circumferential continuity thereof to control resonance. Such a ball-like body is however, liable to disturb the high-speed rotational balance of the tire because the inner surface of the tire receives a full gravity of the ball-like body which increases as the rotational speed increases. Further, it has a tendency to make it difficult to mount the tire on a wheel rim.

In published Japanese patent application JP-A-8-132816 (application No. 6-303174), an assembly of a wheel rim and a pneumatic tire mounted thereon is disclosed, wherein unwoven fabric is applied to the inner surface of the tire as a sound absorber. It is however, difficult to fully control resonance.

In published Japanese Utility Model application JP-U-63-112905 (application No. 62-4990), an assembly of a wheel rim and a pneumatic tire mounted thereon is disclosed, wherein a band-like continuous urethane rubber is disposed around the wheel rim loosely and fixed to the rim well at four points at regular intervals in the circumferential direction so that the portions of the urethane rubber between the fixed points bulge out like an arch due to centrifugal force during running. In this case, it is difficult to obtain a sufficient rising height at a relatively low running speed, and more work is necessary to fix the urethane rubber.

SUMMARY OF THE INVENTION

It is therefore, an object of the present invention to provide a noise damper to be disposed in an annular tire cavity formed between a wheel rim and a pneumatic tire mounted thereon, which is easy to fix and which can effectively reduce a tire noise due to circumferential resonance of the air in the tire cavity without disturbing the high-speed rotational balance of the wheel.

According to the present invention, a noise damper comprises an annular band-like body made of an elastomeric material, the annular band-like body provided with at least one generally U-shaped cut oriented in a circumferential direction, whereby a cutout by the at least one generally U-shaped cut forms a flap which is risen by a centrifugal force during running, and the remainder forms a base band to be put around a bottom of the wheel rim in an elongated condition to secure the flap.

The flap may have a relatively long length such that, when risen, a radially outer end portion thereof comes into contact with the radially inside of a tread portion of the tire so that a main portion which traverses the tire cavity is subjected to variable bending deformation during running. Therefore, resonance conditions are varied, and the noise due to resonance of the air in the tire cavity can be effectively reduced in not only the fundamental mode but also the higher harmonic modes along the circumferential length of the tire cavity.

The at least one generally U-shaped cut for forming a flap may be two opposite U-shaped cuts wherein an open end of the U-shape of one of the U-shaped cuts enters in the U-shape of the other U-shaped cut from an open end thereof without intersecting each other. In this case, the length of the flap is increased although the apparent circumferential length is short. Thereby, it becomes possible to increase the number of the long flaps.

Further, the flap may be made of nonwoven fabric at least partially, for example it is possible to make one side of the flap with unwoven fabric. In this case, the resonance of the air in the tire cavity can be effectively damped in not only the fundamental mode but also the higher harmonic modes.

For the rotational balance of the wheel, it is important that the rising flaps are arranged evenly around the rotational axis. However, even arrangement tends to induce resonance in higher harmonic modes causing high frequency noise because there is a possibility that a standing wave having nodes positioned at the rising flaps occurs although the resonance in the fundamental harmonic mode can be effectively controlled. If the surface of the flaps is hard and flat, such is remarkable. By using the longer flap or unwoven fabric, the resonance in higher harmonic modes can be effectively reduced.

DESCRIPTION OF THE PREFERRED EMBODIMENTS

Figure 1:
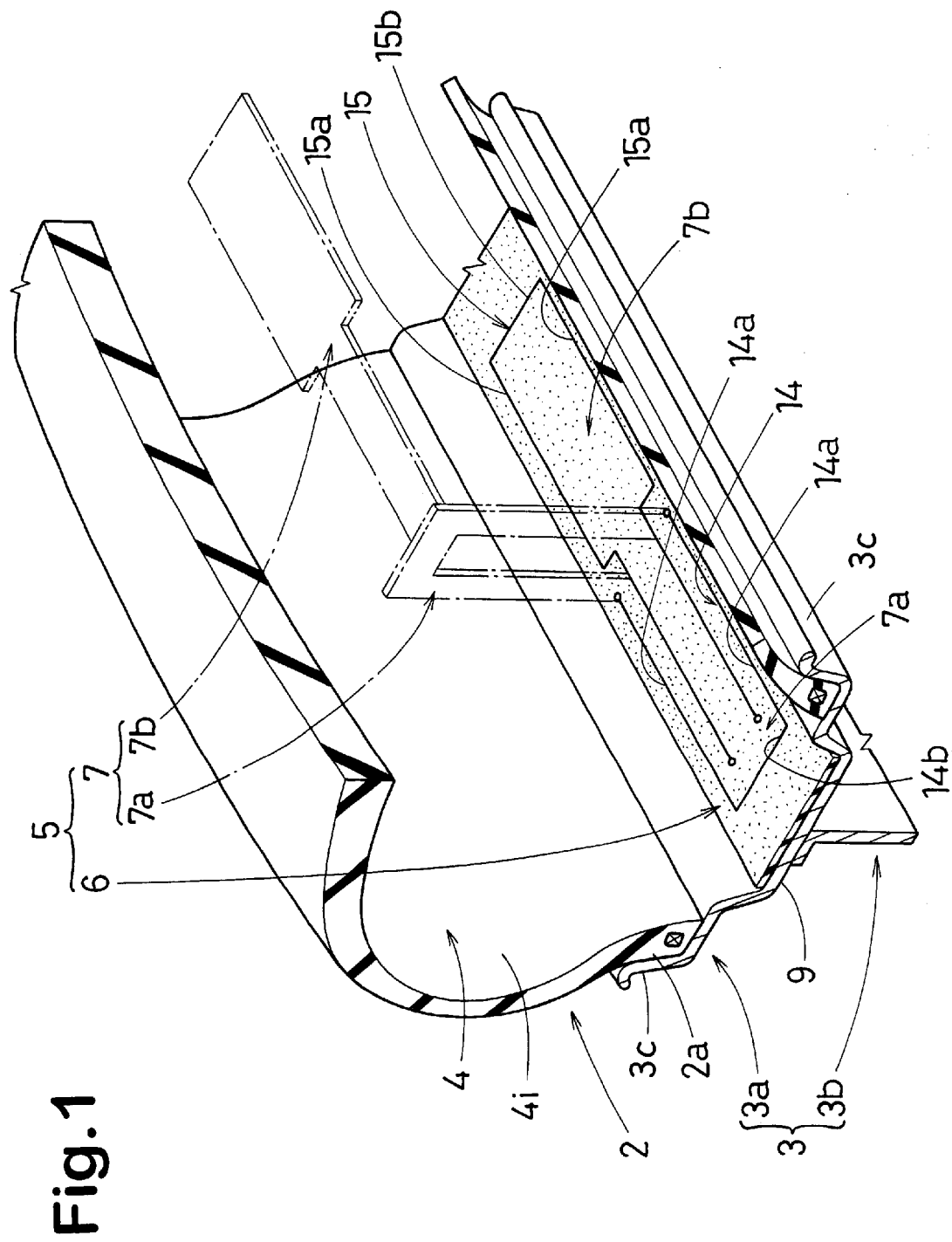
FIG. 1 is a perspective view showing a tire noise damper according to the present invention together with a wheel rim and a pneumatic tire mounted thereon.

Embodiments of the present invention will now be described in detail in conjunction with the accompanying drawings.

In the drawings, a pneumatic tire 2 is mounted on a wheel rim 3 and an annular closed tire cavity 4 is formed around the wheel rim 3.

The pneumatic tire 2 is a tubeless tire comprising a tread portion, a pair of sidewall portions and a pair of bead portions. For example, the tire 2 is a radial tire for passenger cars. To use the tire without a tire tube, the tire is provided with a gas impermeable rubber compound (inner liner) over the inner surface thereof.

The wheel rim 3 comprises a pair of axially spaced bead seats 3a on which the tire bead portions seat, a rim well 9 between the bead seats, and a pair of flanges 3c each extending radially outwardly from one of the bead seats 3a so as to extend along the axially outer surface of the bead portion. For example, the wheel rim 3 is provided around a disk 3b. The rim well 9 substantially continues along the circumference, and the bottom thereof has a width RW. There are instances where the rim well bottom inclines at a small angle with respect to the axial direction and/or the width RW slightly varies.

Before the pneumatic tire 2 is mounted on the wheel rim 3, a noise damper 5 is put around the wheel rim 3 so that the damper 5 sinks in the bottom of the rim well 9 not to hinder the rim mounting operation.

The noise damper 5 comprises at least one, preferably at least two, more preferably three or more of flexible rising flaps 7 and an elastic base band 6 secured to the wheel rim 3. By a centrifugal force during running, the rising flap 7 is risen radially outwards into the tire cavity 4 from the base band 6 whereby the rising flap 7 can block off the annular tire cavity 4.

In case of the damper 5 provided with a plurality of rising flaps 7, it is important that the rotational balance of the tire is not disturbed thereby. Therefore, the rising flaps are formed such that, when rising, they position evenly in the circumferential direction, namely at substantially regular intervals around the rotational axis.

The elastic base band 6 is made of an elastomeric material. The flap 7 is made of a flexible material which may be an elastomeric material.

In FIGS. 1–6 showing embodiments of the present invention, the damper 5 comprising a plurality of flaps 7 and a base band 6 is formed by providing cuts on an annular elastomeric material. In other words, each rising flap 7 is cut out from the annular elastomeric material, and the base band 6 is formed as the remaining part of the annular elastomeric material.

For the elastomeric material, various elastomers, e.g. vulcanized rubber such as natural rubber, isoprene rubber, butadiene rubber and the like may be used. The thickness thereof is set in a range of from 0.5 to 3 mm, preferably 0.5 to 2 mm when not elongated. The width BW of the annular elastomeric material can be determined based on the width RW of the bottom 9 of the wheel rim 3. Usually, the width BW is set to be not more than the width RW so that the damper 5 can completely sink in the bottom of the rim well 9. In this embodiment, the width BW is the substantially same as the width RW.

The base band 6 is fitted to the bottom 9 of the wheel rim 3 in a slightly elongated condition. In case that the base band 6 is made of vulcanized rubber, the ratio (Lb/La) between the circumference La of the base band 6 (before fitted to the rim well 9) and the circumference Lb of the bottom 9 of the wheel rim 3, namely the circumference Lb of the base band 6 fitted to the wheel rim 3 is preferably set in a range of more than 1.0 but not more than 1.3, more preferably 1.08 to 1.16. If the ratio (Lb/La) is not more than 1.0, the rising flap 7 becomes hard to rise. If the ratio (Lb/La) is more than 1.3, the base band 6 is liable to break, and thus the durability tends to decrease.

Figure 2:
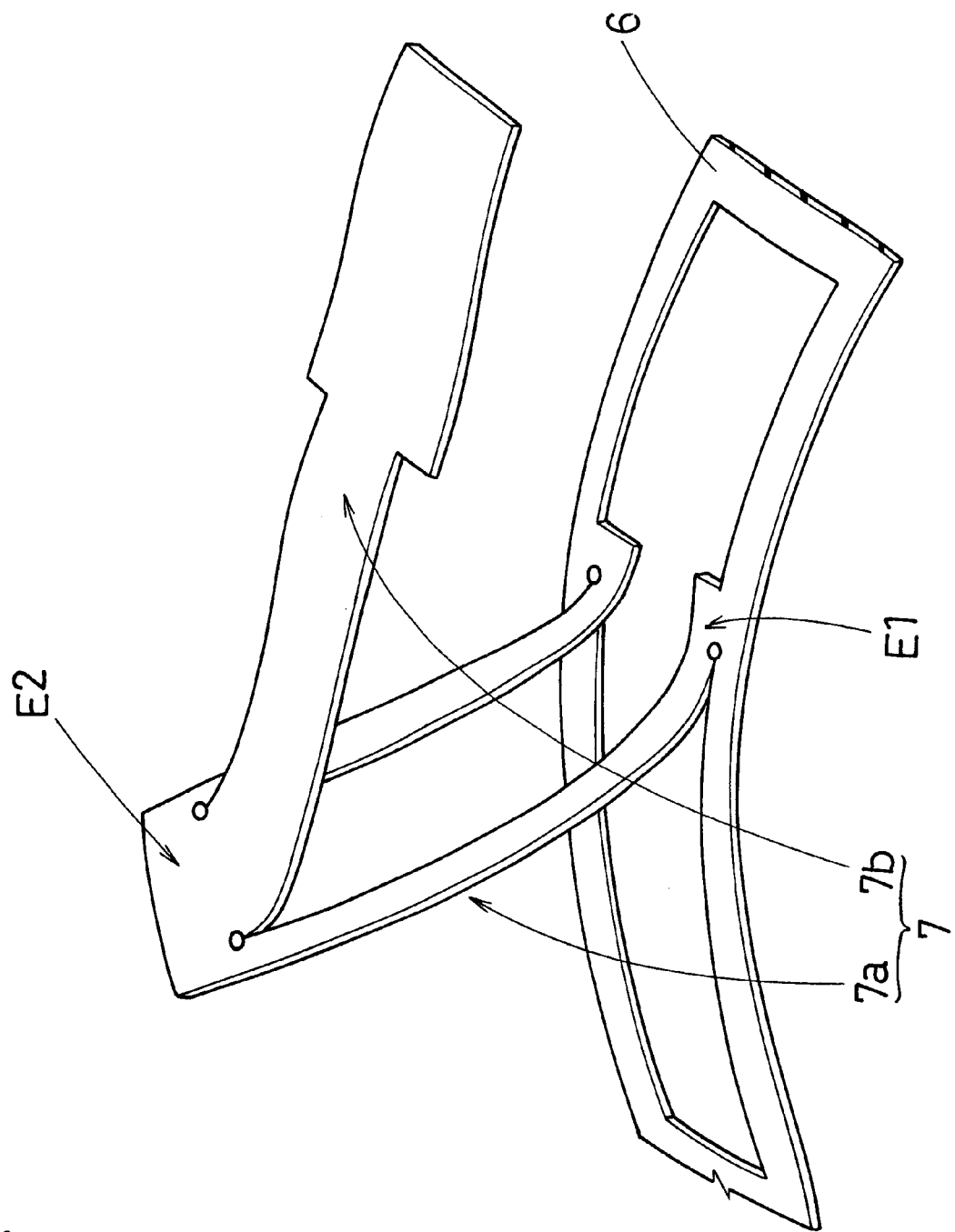
FIG. 2 is a partial perspective view showing a rising flap thereof.

Each flap 7 comprises a main part 7a and contact part 7b as shown in FIGS. 1 and 2. The main part 7a traverses the tire cavity 4 and the contact part 7b touches to the inner surface of the tire on the radially inside of the tread portion when rising.

In the embodiment shown in FIGS. 1–5, one rising flap 7 is formed by two U-shaped cuts. In the embodiment shown in FIG. 6, one rising flap 7 is formed by one generally U-shaped cut. In case that the damper is provided with three or more flaps 7, the former is suitable because the apparent circumferential length of each flap when not risen is relatively short.

Figure 3:
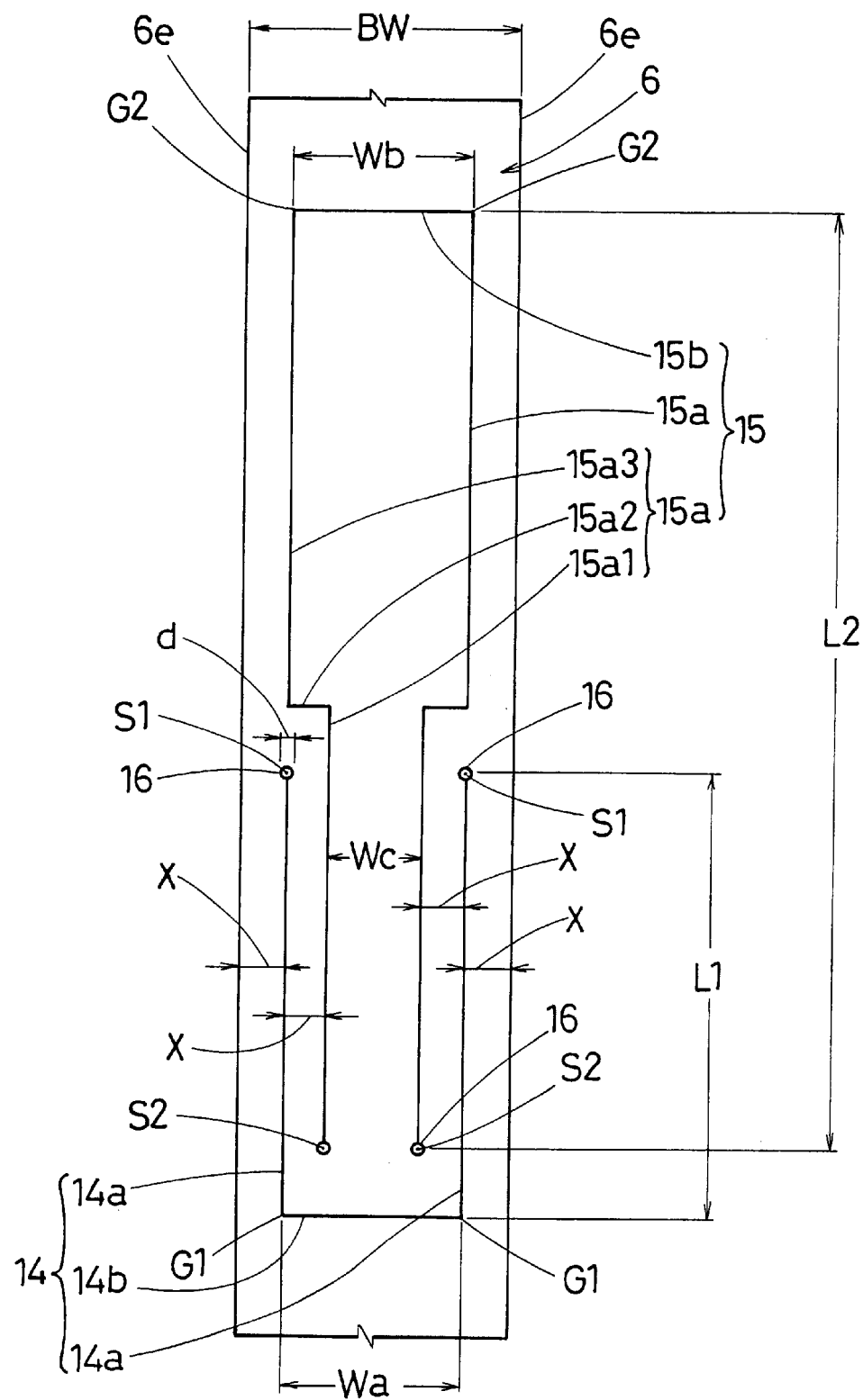
FIG. 3 is a partial plan view of the tire noise damper showing cutting lines for forming the rising flap.

In the embodiment shown in FIGS. 1–5, the above-mentioned cuts for forming each flap 7 can be considered as two opposite generally U-shaped cuts: a first U-shaped cut 14 and a second U-shaped cut 15. As shown in FIG. 3, the first U-shaped cut 14 and second U-shaped cut 15 are circumferentially oriented in opposite directions such that the open end of the U-shape of the second U-shaped cut 15 enters in the U-shape of the first U-shaped cut 14 from the open end thereof. The second U-shaped cut 15 is longer than the first U-shaped cut 14 in the circumferential direction.

The first U-shaped cut 14 is made up of a pair of circumferentially extending first longitudinal cuts 14a and a first transverse cut 14b. The paired first longitudinal cuts 14a extend in parallel with the circumferential direction from starting points S1 at the substantially same circumferential positions to terminal points G1 at the substantially same circumferential positions. The first transverse cut 14b extends in the widthwise direction between these terminal points G1.

The second U-shaped cut 15 is made up of a pair of circumferentially extending second longitudinal cuts 15a and a second transverse cut 15b. The second longitudinal cuts 15a extends from starting points S2 at the substantially same circumferentially positions to terminal points G2 at the substantially same circumferential positions. The second transverse cut 15b extends between these terminal points G2. The starting points S2 are provided between the first longitudinal cuts 14a near the first transverse cut 14b, namely, in the U-shape of the first U-shaped cut 14. And the second longitudinal cuts 15a extends towards the reverse direction to the first transverse cuts 14b beyond the starting points S1.

As shown in FIG. 3, each of the second longitudinal cuts 15a has a crank shape, that is, the cut 15a is made up of two circumferential parts 15a1 and 15a3 shifted in the widthwise direction and a transverse part 15a2 extending therebetween. The circumferential parts 15a1 and 15a3 are parallel with the circumferential direction. The second transverse cut 15b is parallel with the widthwise direction.

The width Wb between the circumferential parts 15a3 is the substantially same as the width Wa between the circumferential parts 14a. The width Wc between the circumferential parts 15a1 is narrower than the width Wb. Usually, the widths are set as follows:

Wb/BW=about 0.05 to 0.9
Wa/BW=about 0.16 to 0.90
Wc/BW=about 0.05 times Wa/BW

The distance X between the first longitudinal cuts 14a and the side edges 6e of the base band 6 and the distance X between the first longitudinal cuts 14a and the second longitudinal cuts 15a in the widthwise direction are preferably more than 2 mm, more preferably more than 3 mm.

Figure 4:
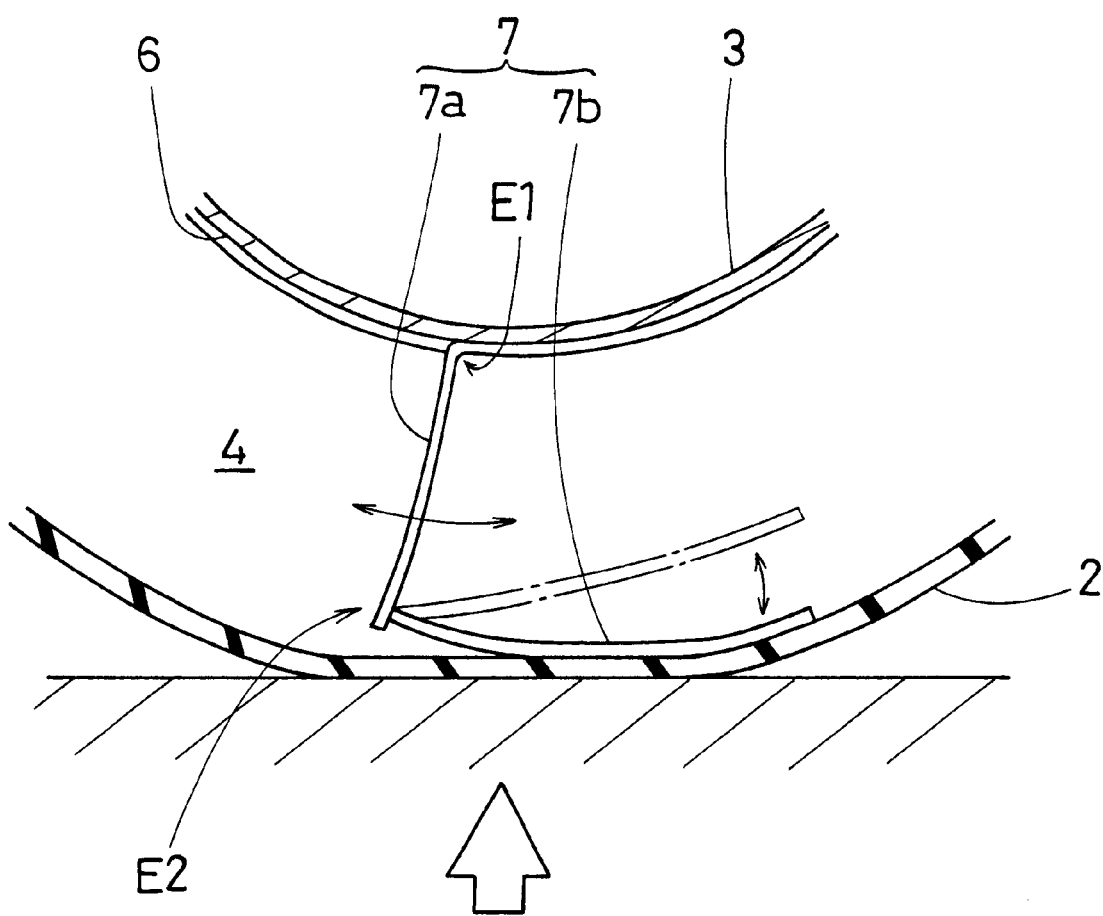
FIG. 4 is a schematic sectional view of the ground contacting patch of the tire showing a state of the rising flap during running.
Figure 5:
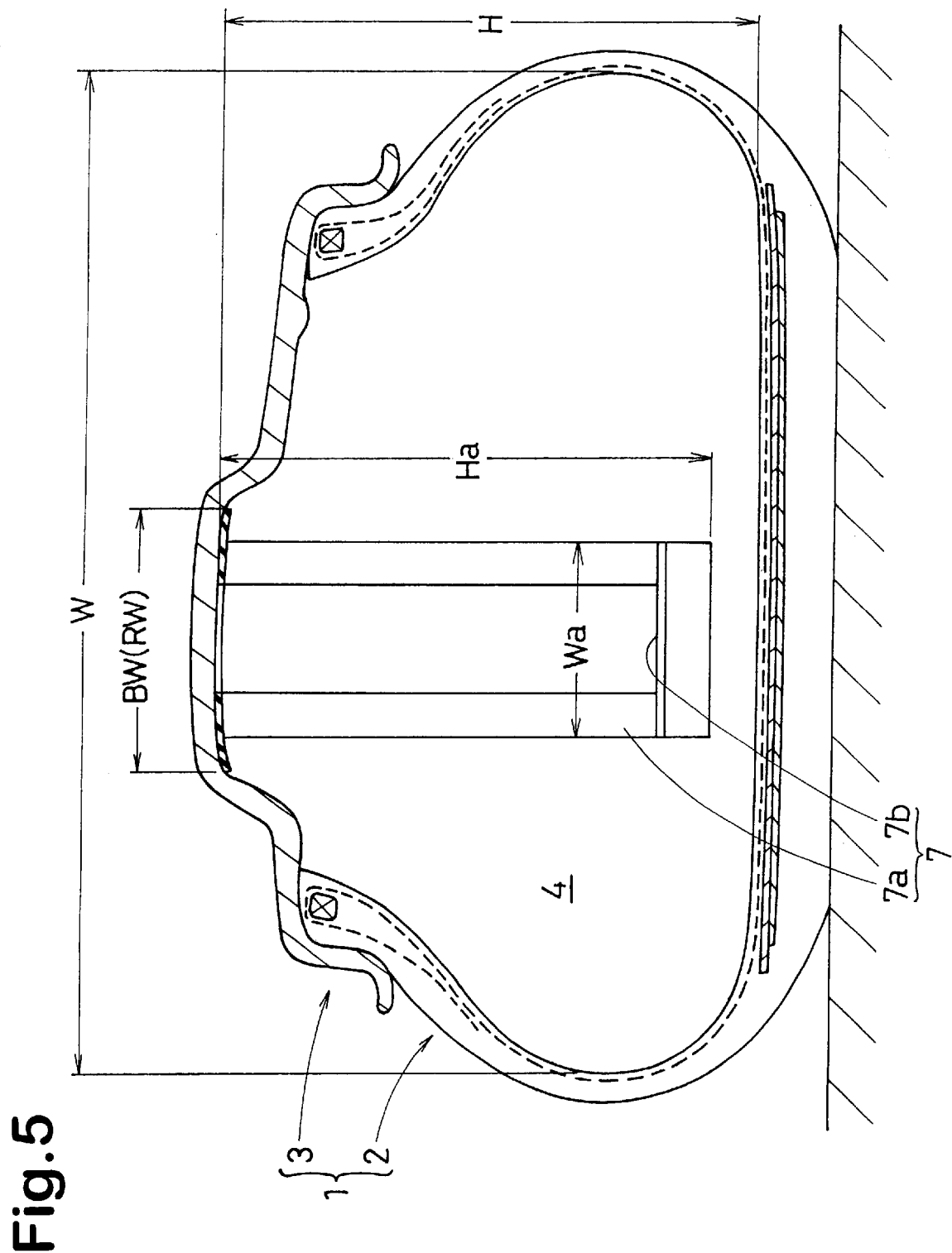
FIG. 5 is a cross sectional view for explaining the dimensions of various parts thereof.

As shown in FIGS. 3–5, the circumferential length L1 of the first longitudinal cuts 14 is set in a range of from 20 to 100%, preferably 50 to 100% of the height H of the tire cavity 4. The circumferential length L2 of the second longitudinal cuts 15 is set in a range of from 50 to 350% preferably 100 to 250% of the height H of the tire cavity 4.

Here, the height H of the tire cavity 4 is defined as the radial distance between the bottom 9 of the wheel rim 3 and the inside of the tire tread portion measured along the tire equatorial plane in the ground patch of the tire 2 under such condition that the tire is mounted on the wheel rim 3, inflated to the standard inner pressure, and loaded with 74% of the standard load. Usually, the above-mentioned wheel rim 3 is the "standard rim" specified in JATMA, the "Measuring Rim" in ETRTO, the "Design Rim" in T&RA or the like. The standard pressure is the "maximum air pressure" in JATMA, the "Inflation Pressure" in ETRTO, the maximum pressure given in the "Tire Load Limits at Various Cold Inflation Pressures" table in T&RA or the like. In case of passenger car tires, however, 200 kPa is used as the standard pressure. The standard load is the "maximum load capacity" in JATMA, the "Load Capacity" in ETRTO, the maximum value given in the above-mentioned table in T&RA or the like.

Therefore, as shown in FIG. 4, the main part 7a traversing the tire cavity 4 is generally formed by the first U-shaped cut 14, and the contact part 7b touching to the inside of the tread portion is generally formed by the second U-shaped cut 15. The main part 7a is joined to the base band 6 at one end E1 (hereinafter radially inner end E1). Thus, the other end E2 (hereinafter radially outer end E2) approaches the tread inside 4i when rising. The contact part 7b is joined to the main part 7a at one end (hereinafter radially inner end). The other end can contact with the inside of the tread portion when rising, and the contact part extends circumferentially along the inside of the tread portion when a centrifugal force is applied.

The starting points S1 and S2 of the first and second longitudinal cuts 14 and 15 are each provided with a circular cutout hole 16 to avoid stress concentration and thereby to prevent tear starting therefrom. The diameter (d) of the cutout hole 16 is set in a range of from 2 to 6 mm, preferably 3 to 5 mm. Aside from a circle, various round shapes, e.g. ellipse and the like may be used.

Figure 6:
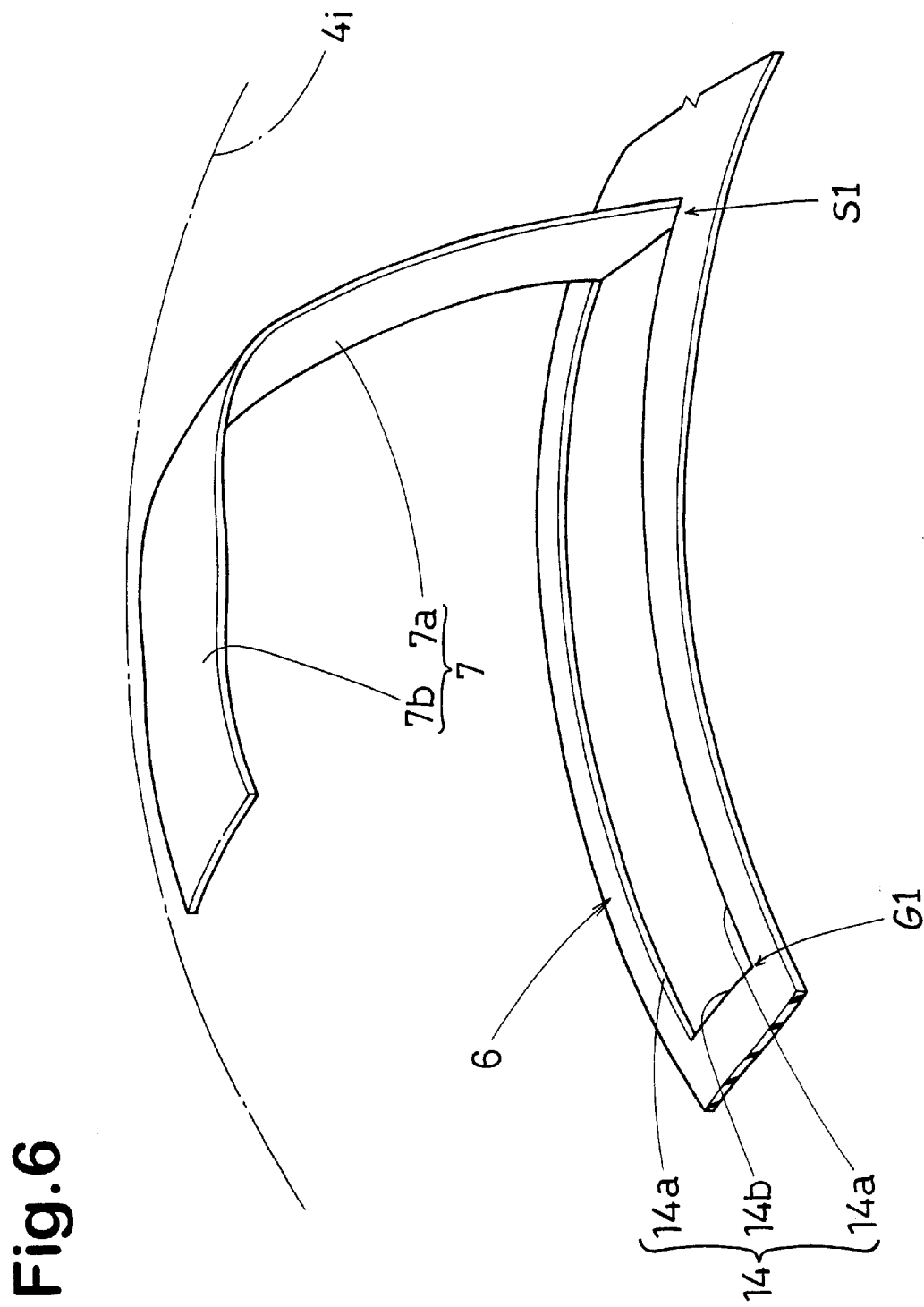
FIG. 6 is a partial perspective view showing another example of the tire noise damper according to the present invention.
Figure 7:
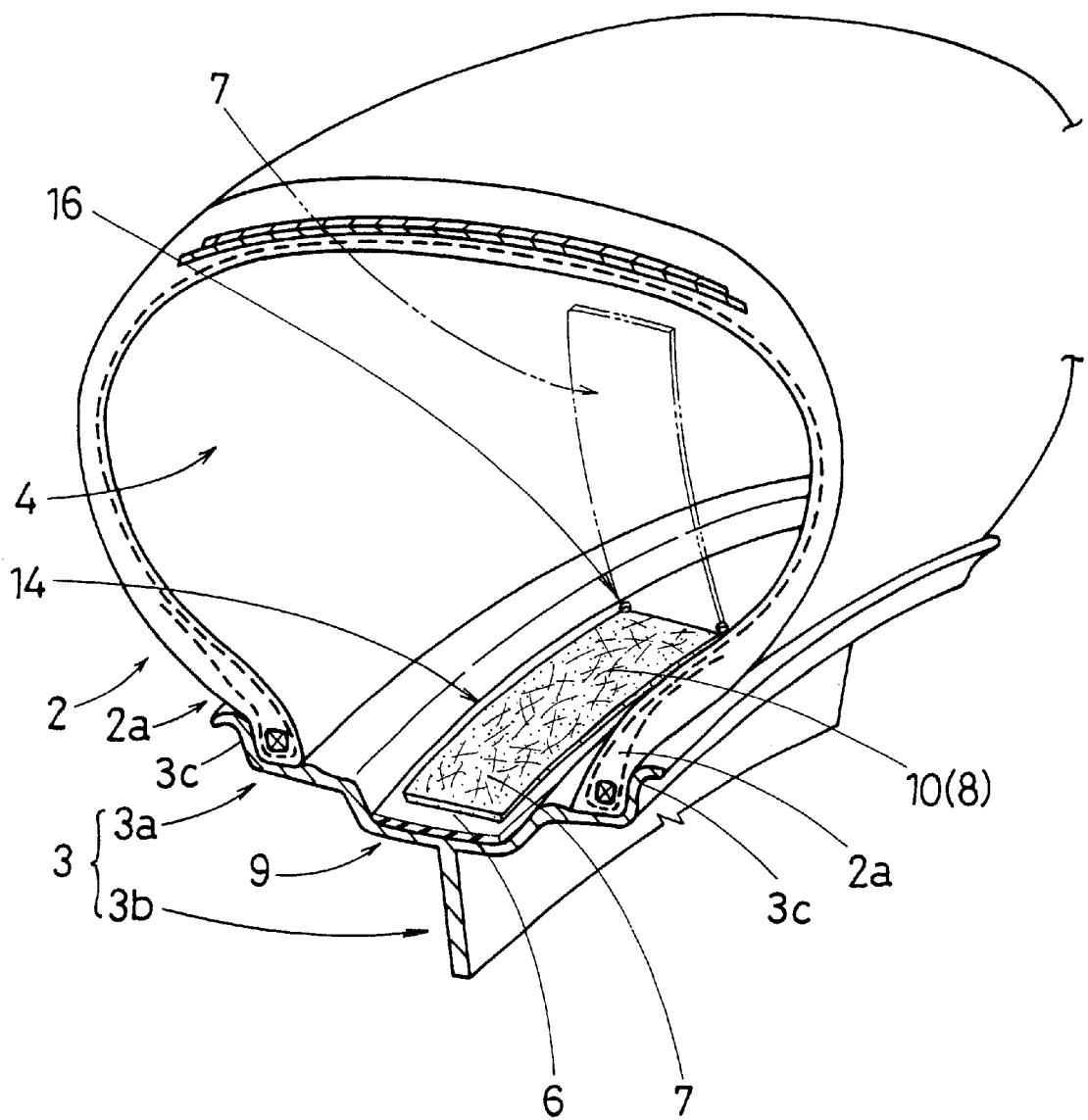
FIG. 7 is a perspective view showing still another example of the tire noise damper according to the present invention together with a wheel rim and a pneumatic tire mounted thereon.
Figure 8:
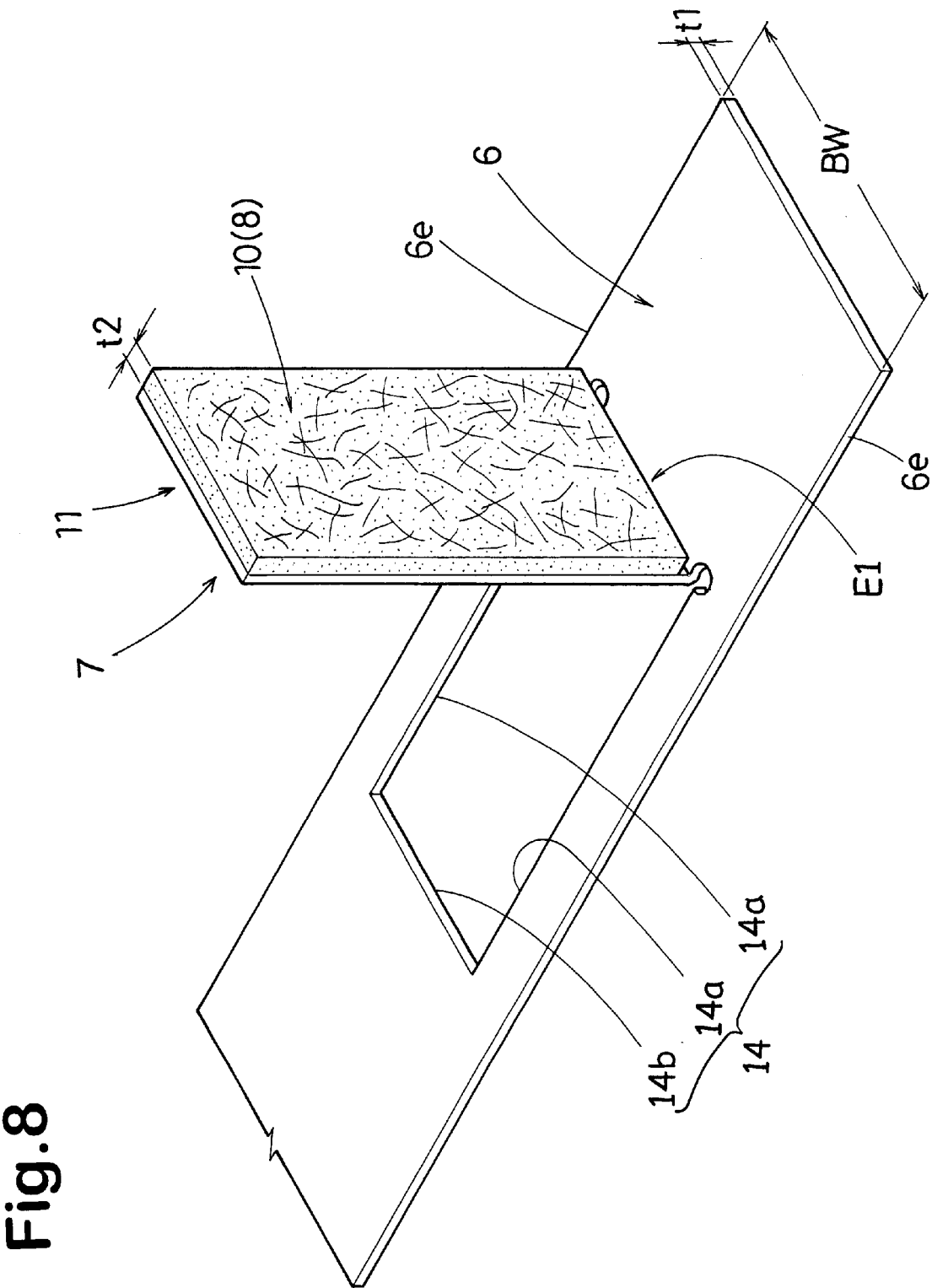
FIG. 8 is a partial perspective view showing a rising flap thereof.
Figure 9:
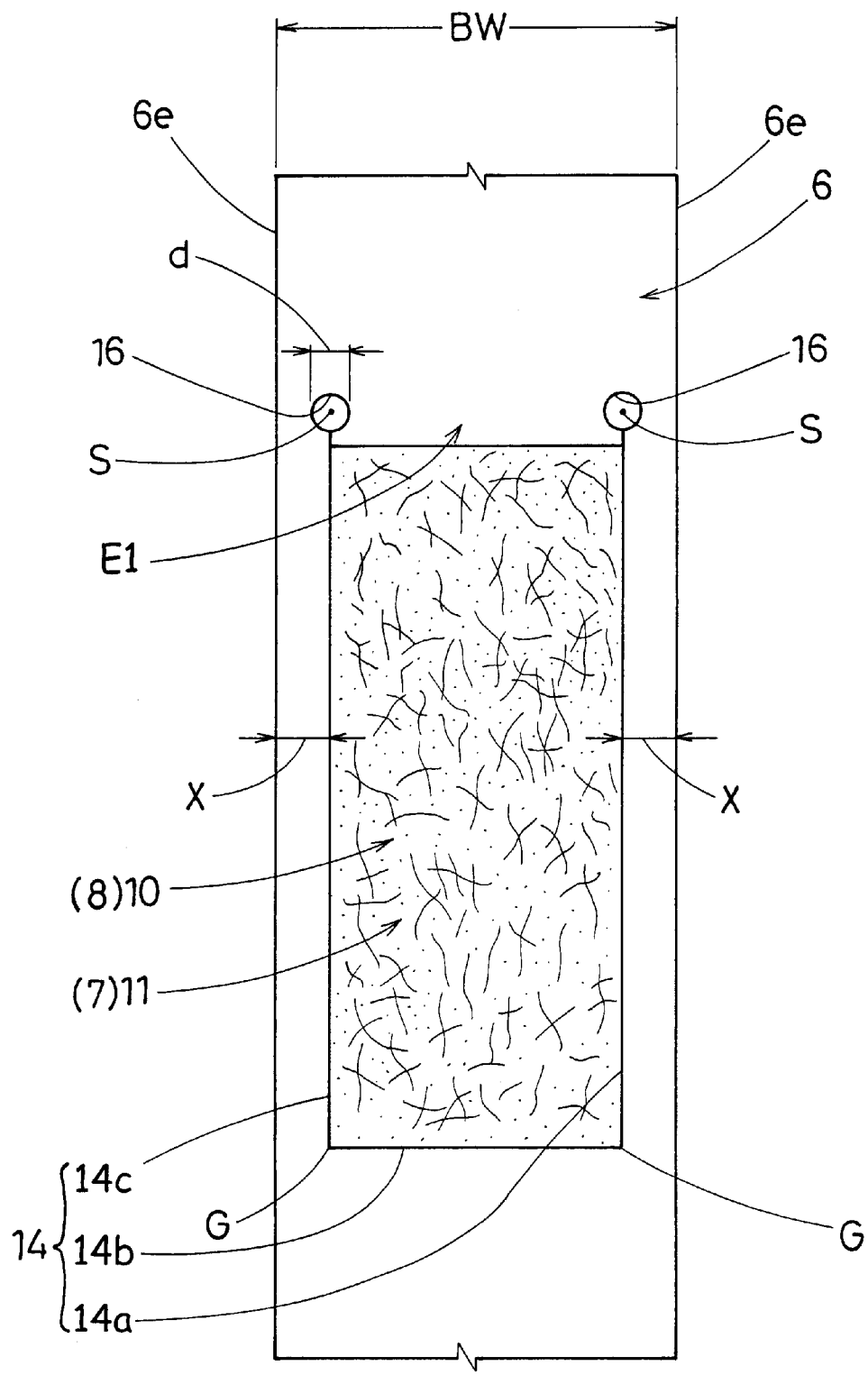
FIG. 9 is a partial plan view of the tire noise damper showing cutting lines for forming the rising flap.

In the embodiment shown in FIG. 6, each flap 7 is formed by one U-shaped cut 14 only.

Similar to the former example, the U-shaped cut 14 is made up of a pair of circumferentially extending longitudinal cuts 14a and a transverse cut 14b. The paired longitudinal cuts 14a extend in parallel with the circumferential direction from starting points S1 at the substantially same circumferential positions to terminal points G1 at the substantially same circumferential positions. The transverse cut 14b extends in the widthwise direction between these terminal points G1. In this case, the circumferential length of the longitudinal cuts 14a is set in a range of not less than 200%, preferably 200 to 450% of the tire cavity height H, whereby the main part 7a and contact part 7b are formed as a single strip having the width Wa. The width Wa is set in a range of about 0.16 to 0.90 times the width BW of the annular elastomeric material. The distance X between the longitudinal cuts 14a and the side edges 6e of the base band 6 in the widthwise direction is preferably more than 2 mm, more preferably more than 3 mm.

In the above-mentioned two embodiments, when the flap 7 is risen by a centrifugal force and the rising flap 7 reaches to the inside of the tread portion, the contact part 7b contacts with the inside of the tread portion and the main part 7a narrows the cross sectional area of the tire cavity 4. In the ground contacting patch, the tire is compressed and the height of the tire cavity 4 decreases. During running, as the rising flap 7 passes through the ground contacting patch, the main part 7a is shaken. As a result, the resonance conditions especially in higher harmonic modes are changed which makes it difficult to generate stable standing waves. Therefore, not only the fundamental harmonic but also higher harmonics are reduced to decrease the overall resonance noise.

FIGS. 7–10 show another embodiment of the present invention.

In comparison with the former two embodiments, the length of the rising flap 7 in this embodiment is short, and there is a possibility that the rising flap 7 can not reach to the inside of the tread portion. In this embodiment, therefore, in order to effectively control not only fundamental harmonic but also higher harmonics, at least one side of the flap 7 is formed by a nonwoven fabric 10.

In the example shown in FIGS. 7–10, similarly to the above-mentioned embodiments, the annular elastomeric material is provided with U-shaped cuts 14 for forming a plurality of flaps 7. In this embodiment, each flap 7 is formed by one U-shaped cut 14 similarly to FIG. 6. The number of the flaps 7 is preferably three or more, and all the U-shaped cuts 14 are oriented in the same circumferential direction. The U-shaped cut 14 is made up of a pair of circumferentially extending longitudinal cuts 14a and a transverse cut 14b. Therefore, the cutout 11 by each U-shaped cut 14 is a single strip having a constant width.

In this example, a piece of nonwoven fabric 10 having the almost same shape as the cutout 11 is bonded to one side of the cutout 11 (the side to be placed on the radially outside when fitted to the wheel rim). Thus, each flap 7 is made up of the nonwoven fabric 10 and elastomer (vulcanized rubber) having a double-layered structure. The remainder of the annular elastomeric material excepting the cutout 11 forms the base band 6 similarly to the former embodiments.

As one of modifications, it may be possible to provide a nonwoven fabric 10 on each side of the rising flap 7. Further, it is also possible to form the damper itself by the nonwoven fabric 10. In this case, because not only the flaps but also base band are made of the same nonwoven fabric 10, the nonwoven fabric 10 should be elastic. The area acting on acoustic absorption increases and the acoustic absorbing power is improved.

The fibers constituting the nonwoven fabric 10 are made of a thermoplastic organic material having a high hysteresis loss (tan fÂ) of 0.01 to 2.00, preferably 0.02 to 1.00 under a temperature of 40 deg. C and a frequency of 110 Hz.

Figure 11:
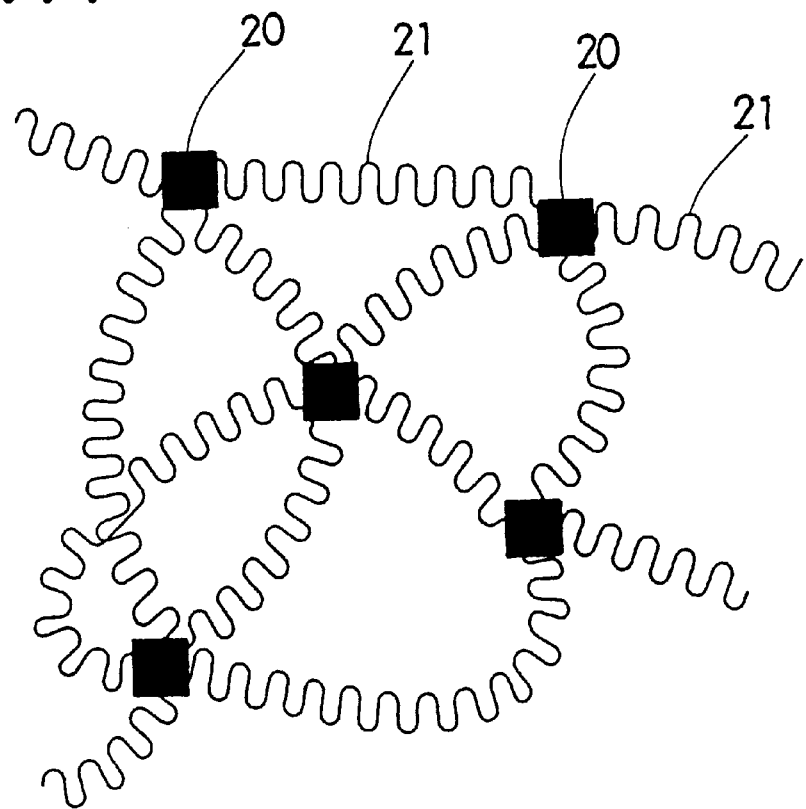
FIG. 11 is a diagram for explaining the polymer structure of a material for organic fibers of a nonwoven fabric.
Figure 12A:
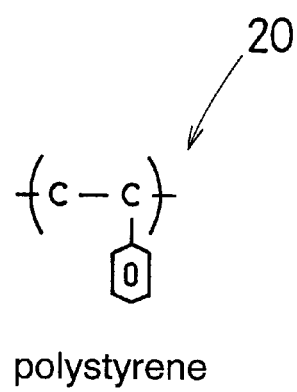
FIG. 12A and FIG. 12B are molecular formulas for a hard block part and a soft block part of a blockcopolymer for the organic fiber, respectively.
Figure 12B:
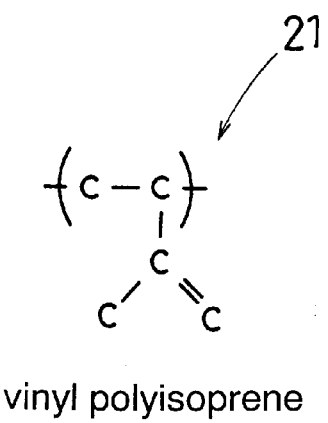

As the organic material, a blockcopolymer comprising hard block parts 20 and soft block parts 21 as shown in FIG. 11 is preferably used. Especially, styrene block copolymer which is a triblockcopolymer in which hard block parts 20 linked by soft block parts 21 and the soft block parts 21 have a glass-transition temperature set at room temperature to show a large hysteresis loss at room temperature is preferably used. In this embodiment, the nonwoven fabric 10 made of styrene-vinyl polyisoprene which is a triblockcopolymer whose hard block part and soft block part are polystyrene and vinyl polyisoprene, respectively, is used. FIGS. 12A and 12B show the structure formulas of such hard block part 20 and soft block parts 21, respectively.

Such fibers have a relatively high coefficient of viscosity and thus the vibration-damping property is excellent. The nonwoven fabric 10 is relatively coarse and air can pass through it. As a result, the nonwoven fabric 10 irregularly reflects sound waves and absorbs the sound energy. Such effects are more in a high frequency range than low frequency range. Thus, the higher harmonics can be greatly reduced.

The nonwoven fabric 10 may be manufactured by blowing molten polymer jetting out from a large number of nozzles (melt-blow method), or by making fiber by spinning molten polymer and bonding the fiber (spun bonding method), or the like. In the melt-blow method, it is easy to make nonwoven fabric of fine fiber. In the spun bonding method, it is possible to make strong fabric.

In any case, it is preferable that the nonwoven fabric 10 has an apparent specific gravity of from 0.02 to 1.5, more preferably 0.03 to 0.5, and a thickness t2 of less than 10 mm, more preferably in a range of 2 to 10 mm, still more preferably 4 to 8 mm. If the thickness t2 is more than 10 mm, it has a tendency to increase the weight and the rolling resistance and make it difficult to mount the tire on the wheel rim. If the apparent specific gravity is less than 0.02, the acoustic absorbing power and vibration-damping power decrease. If the apparent specific gravity is more than 1.5, the irregular reflection becomes hard, and further the weight increases and the rotational balance is liable to becomes worse.

Figure 10:
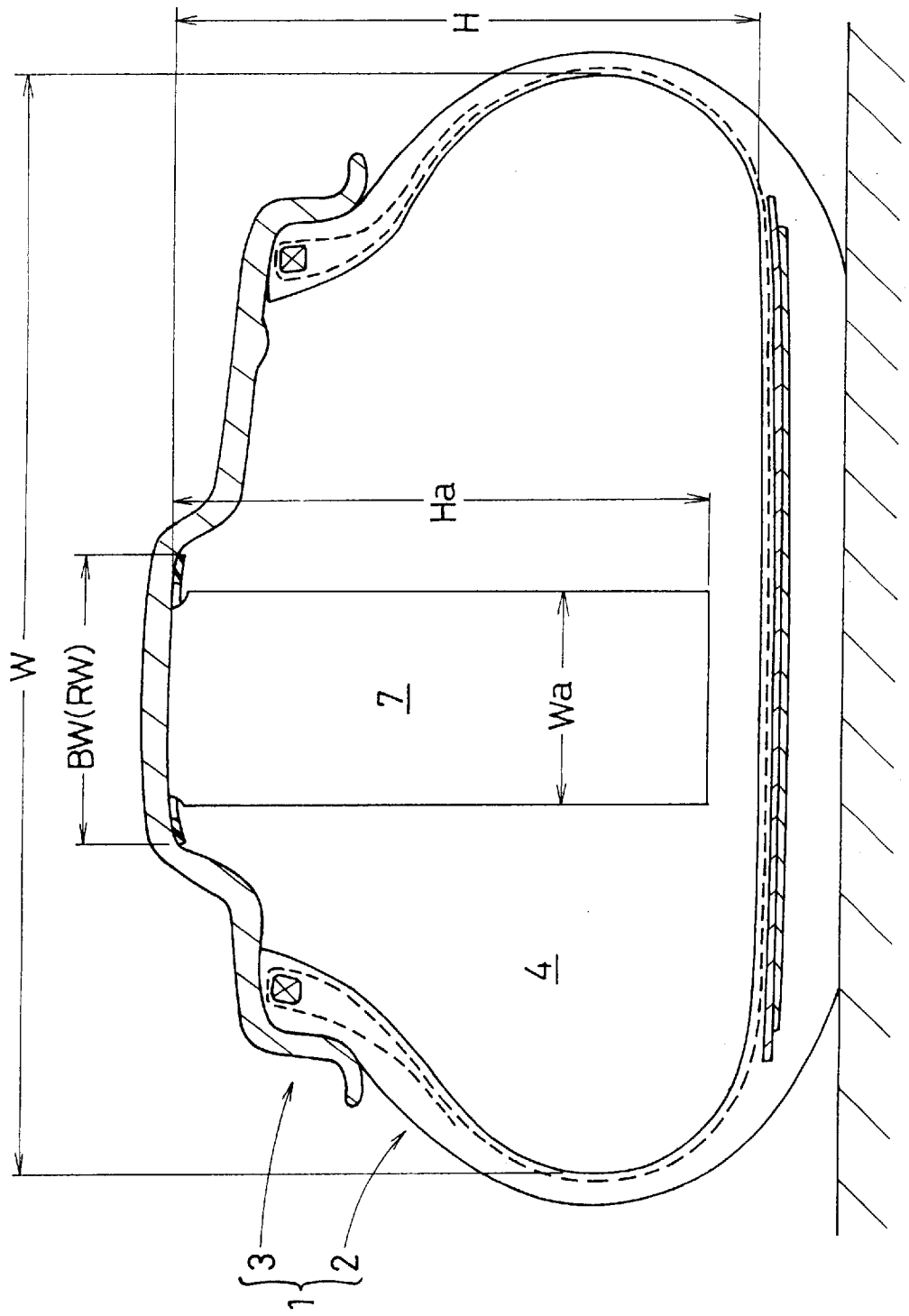
FIG. 10 is a cross sectional view for explaining the dimensions of various parts thereof.

In this embodiment, as shown in FIG. 10, the height Ha of the rising flap 7 corresponding to the circumferential length L1 of the longitudinal cuts 14a is set in a range of from 85 to 100% of the height H of the tire cavity. The width Wa of the rising flap 7 corresponding to the length of the transverse cuts 14b is not less than 20% of the maximum width W of the tire cavity 4. The distance X between the longitudinal cut 14a and the edge 6e is not less than 2 mm, preferably not less than 3 mm. The width BW of the base band 6 is the substantially same as the width RW of the bottom of the rim well 9. The thickness t1 of the base band 6 is set in a range of from 0.5 to 3 mm, preferably 0.5 to 2 mm. The circular cutout holes 16 formed at the starting points S have a diameter which is in a range of from 2 to 6 mm, preferably 3 to 5 mm. The cutout holes 16 not only prevent stress concentration but also make it easy to rise the flap.

Comparison Tests

Using a radial tire of size 195/65R15 for passenger cars and a wheel rim of size 15×6JJ, various dampers were tested.

| Width RW of Rim well bottom: | 55 mm |
|---|---|
| Circumference of Rim well bottom: | 110 cm |
| Height H of Tire cavity: | 109 mm |
| Width W of Tire cavity: | 204 mm |
| Sectional area of Tire cavity: | 189.8 sq. cm |

Noise Test

The assembly of a pneumatic tire, a wheel rim and a damper was mounted on a Japanese 2000cc FR passenger car and run in a noise test course (rough asphalt road) at a speed of 60 km/hr and the sound pressure was measured near the driver's seat to obtain the overall noise level of 226, 240 and 253 Hz. The results are indicated in dB as a difference from Ref.1. (Inner pressure: 200 KPa)

Tire Mounting Test

The difficulty of putting the damper around the wheel rim and the difficulty of mounting the tire on the wheel rim by hand were evaluated. In the test results, "A" means "no difficulty", "B" means "little hard".

Durability Test

Using a tire test drum, the wheel was rotated at a speed of 60 km/hr for one hour (tire load=500 N, pressure=200 KPa), and the damper was checked for damages such as cracks at the dead ends of the cuts. If there was no damage, the damper was ranked as "A". If the band was broken, it was ranked as "B".

The test results are shown in Table 1 and Table 2.

TABLE 1

| Assembly | Ref. A1 | Ex. A1 | Ref. A2 | Ex. A2 | Ex. A3 |
|---|---|---|---|---|---|
| Damper | none | FIG. 1 | none | FIG. 1 | FIG. 6 |
| Band main body | | | | | |
| Width BW (mm) | | 55 | 55 | 55 | 55 |
| Circumference La (cm) | | 102 | 102 | 102 | 102 |
| La/Lb (Lb = 110 cm) | | 1.08 | 1.08 | 1.08 | 1.08 |
| Thickness (mm) | | 1 | 1 | 1 | 1 |
| Rising flap | | | | | |
| Length L1 (mm) | | 100 | 100 | 100 | 100 |
| Width Wa (mm) | | 40 | 40 | 40 | 40 |
| Length L2 (mm) | | 210 | | 250 | 210 |
| Width Wb/Wc (mm) | | 40/25 | | 40/25 | 40 |
| Noise (dB) | 0 | −0.7 | −0.4 | −1 | −0.8 |
| Rim mounting | A | A | A | A | A |
| Durability | | A | A | A | A |

TABLE 2

| Assembly | Ref. B1 | Ref. B2 | Ex. B1 | Ex. B2 | Ex. B3 |
|---|---|---|---|---|---|
| Damper | none | | | | |
| Band main body | | | | | |
| Width BW (mm) | | 55 | 55 | 55 | 55 |
| Circumference La (cm) | | 102 | 102 | 102 | 102 |
| La/Lb (Lb = 110 cm) | | 1.08 | 1.08 | 1.08 | 1.08 |
| Thickness (mm) | | 1 | 1 | 1 | 1 |
| Rising flap | | FIG. 8 | FIG. 8 | FIG. 8 | FIG. 8 |
| Number | | 6 | 6 | 6 | 6 |
| Nonwoven fabric *1 | | none | ∘∘ | ∘∘ | B |
| Size (mm) | | none | 90 × 40 × 4 | 90 × 40 × 10 | 90 × 40 × 4 |
| Distance X (mm) | | 7.5 | 7.5 | 7.5 | 7.5 |
| Height Ha (mm) | | 100 | 100 | 100 | 100 |
| Ha/H (%) | | 91 | 91 | 91 | 91 |
| Width Wa (mm) | | 40 | 40 | 40 | 40 |
| Wa/W (%) | | 21 | 21 | 21 | 21 |
| Noise (dB) | 0 | −1.6 | −2.5 | −4 | −3.5 |
| Rim mounting | A | A | A | B | A |
| Durability | | A | A | A | B |

*1 ∘∘: nonwoven fabric was disposed on the outside only
B: nonwoven fabric was disposed on both sides
nonwoven fabric made of styrene-vinyl polyisoprene

What is claimed is:

1. A tire noise damper disposed in an annular tire cavity formed between a wheel rim and a pneumatic tire mounted thereon,
    said tire noise damper comprising an annular band-like body made of an elastomeric material,
    said annular band-like body provided with at least one generally U-shaped cut oriented in a circumferential direction, whereby a cutout by said at least one generally U-shaped cut forms a flap risen by a centrifugal force during rotation of the wheel, and the remainder of said annular band-like body forms a base band to be put around a bottom of the wheel rim in an elongated condition, wherein said flap has a length such that, when risen, a radially outer end portion thereof comes into contact with the radially inside of a tread portion of the tire so that a main portion of the flap which traverses the tire cavity is subjected to variable bending rotation of the wheel.

2. The tire noise damper according to claim 1, wherein said at least one generally U-shaped cut for forming a flap is two opposite U-shaped cuts arranged such that an open end of the U-shape of one of the U-shaped cuts enters in the U-shape of the other U-shaped cut from an open end thereof without intersecting each other.

3. The tire noise damper according to claim 1, wherein said at least one generally U-shaped cut for forming a flap is a single U-shaped cut.

4. The tire noise damper according to claim 1, wherein said flap is, at least partially, made of nonwoven fabric.

5. The tire noise damper according to claim 1, wherein said flap is composed of said cutout and nonwoven fabric adhered to one side of the cutout.

6. The tire noise damper according to claim 4 or 5, wherein the nonwoven fabric has an apparent specific gravity in a range of from 0.02 to 1.5.

7. The tire noise damper according to claim 4 or 5, wherein the nonwoven fabric has an apparent specific gravity in a range of from 0.02 to 1.5, and fibers forming the nonwoven fabric are made of a thermoplastic organic material having a hysteresis loss of 0.01 to 2.00 under a temperature of 40 deg. C and a frequency of 110 Hz.

8. The tire noise damper according to claim 4 or 5, wherein the nonwoven fabric has an apparent specific gravity in a range of from 0.02 to 1.5, and fibers forming the nonwoven fabric are made of styrene block copolymer in which hard block parts are linked by soft block parts having a glass-transition temperature set at room temperature.

9. A tire noise damper disposed in an annular tire cavity formed between a wheel rim and a pneumatic tire mounted thereon, said tire noise damper comprising an annular band-like body made of an elastomeric material, said annular band-like body provided with at least one generally U-shaped cut oriented in a circumferential direction, whereby a cutout by said at least one generally U-shaped cut forms a flap risen by a centrifugal force during rotation of the wheel, and the remainder of said annular band-like body forms a base band to be put around a bottom of the wheel rim in an elongated condition, wherein said flap is composed of said cutout and non-woven fabric adhered to one side of the cutout.

10. The tire noise damper according to claim 9, wherein the non-woven fabric has an apparent specific gravity in a range of from 0.02 to 1.5.

11. The tire noise damper according to claim 9, wherein the non-woven fabric has an apparent specific gravity in a range of from 0.02 to 1.5, and Fibers forming the non-woven fabric are made of a thermoplastic organic material having a hysteresis loss of 0.01 to 2.00 under a temperature of 40° C. and a frequency of 110 Hz.

12. The tire noise damper according to claim 9, wherein a non-woven fabric has an apparent specific gravity in a range of from 0.02 to 1.5, and fibers forming the non-woven fabric are made of styrene block copolymer in which hard block parts are linked by soft block parts having a glass-transition temperature set at room temperature.

* * * * *